(12) United States Patent  
Kriswandhi Bakker et al.

(10) Patent No.: US 12,530,518 B2  
(45) Date of Patent: Jan. 20, 2026

(54) LENGTH COMPENSATING WAVEGUIDE FOR AN OPTICAL CIRCUIT

(71) Applicant: Synopsys, Inc., Mountain View, CA (US)

(72) Inventors: Arjen Franciscus Kriswandhi Bakker, Hengelo (NL); Teunis Dubbink, Enschede (NL); Thomas Hakkers, Overijssel (NL); Francesc Vila Garcia, Enschede (NL)

(73) Assignee: Synopsys, Inc., Sunnyvale, CA (US)

( * ) Notice: Subject to any disclaimer, the term of this patent is extended or adjusted under 35 U.S.C. 154(b) by 880 days.

(21) Appl. No.: 17/848,614

(22) Filed: Jun. 24, 2022

(65) Prior Publication Data

US 2022/0414313 A1 Dec. 29, 2022

Related U.S. Application Data

(60) Provisional application No. 63/215,286, filed on Jun. 25, 2021.

(51) Int. Cl.
*G06F 30/398* (2020.01)
*G02B 27/00* (2006.01)
*G06F 111/04* (2020.01)

(52) U.S. Cl.
CPC ....... *G06F 30/398* (2020.01); *G02B 27/0012* (2013.01); *G06F 2111/04* (2020.01)

(58) Field of Classification Search
USPC ........................................................ 716/112
See application file for complete search history.

(56) References Cited

U.S. PATENT DOCUMENTS

| | | | | |
|---|---|---|---|---|
| 2009/0116786 | A1* | 5/2009 | Little | G02B 6/29394 385/27 |
| 2013/0140649 | A1* | 6/2013 | Rogers | B82Y 10/00 438/48 |
| 2018/0335570 | A1* | 11/2018 | Fanto | G02F 1/3132 |
| 2022/0414313 | A1* | 12/2022 | Kriswandhi Bakker | G06F 30/398 |

FOREIGN PATENT DOCUMENTS

WO WO-2022272024 A1 * 12/2022 ........... G06F 30/398

OTHER PUBLICATIONS

International Preliminary Report on Patentability, International Application No. PCT/US2022/034842, Dated Jan. 4, 2024, Consists of 11 pages.

(Continued)

*Primary Examiner* — Mohammed Alam  
(74) *Attorney, Agent, or Firm* — Patterson + Sheridan, LLP

(57) ABSTRACT

A system and method generates a compensation circuit element for an optical circuit design by receiving an optical circuit design. The optical circuit design includes optical circuit elements and channels optically connecting the optical circuit elements. Further, a first compensation length for a first channel of the channels is determined based on a first measured length parameter of the first channel and a first design length parameter associated with the first channel. A compensation circuit element is determined based on the first compensation length. An updated optical circuit design is determined based on the compensation circuit element.

20 Claims, 7 Drawing Sheets

(56) References Cited

OTHER PUBLICATIONS

Weyl-Kuo Wang et al: "Phase Compensation of Bent Silica-Glass Optical Channel Waveguide Devices by Vector-Wave Mode-Matching Method", Journal of Lightwave Technology, vol. 15, No. 3, Mar. 1, 1997, DOI: 10.1109/50.557571.

Hai Mohammed Shafiqul et al: "Low-Loss Passive Si3 N4 Serial-to-WDM Interface for Energy-Efficient Optical Interconnects", Journal of Lightwave Technology, vol. 34, No. 23, Dec. 1, 2016, pp. 5444-5452, DOI: 10.1109/JLT. 2016.2614945.

Chang Cheng-Chung et al: "Optimization of on-chip photonic delay lines for telecom wavelengths", Journal of Physics: Conference Series, vol. 1124, Dec. 22, 2018, pp. 1-5, DOI: 10.1088/1742-6596/1124/5/051052.

International Search Report and Written Opinion, International Application No. PCT/US2022/034842, Dated Nov. 4, 2022, Consists of 13 Pages.

\* cited by examiner

LENGTH COMPENSATING WAVEGUIDE FOR AN OPTICAL CIRCUIT

RELATED APPLICATION

This application claims the benefit of U.S. provisional patent application Ser. No. 63/215,286, filed Jun. 25, 2021, which is hereby incorporated herein by reference.

TECHNICAL FIELD

The present disclosure generally relates to an electronic design automation (EDA) system for a photonic circuit. In particular, the present disclosure relates to a system and method for providing a length compensating waveguide for an optical circuit.

BACKGROUND

In photonic integrated circuits (PICs), light signals are used as a carrier of information between an input and an output, and between circuit elements. PICs may be used to de-multiplex telecommunication signals, process light detection and ranging (LiDAR) light signals, and/or process microwave signals, among others. PICs may have multiple channels that each communicate a different light signal. A PIC can be designed to provide a timing difference between the different channels. In one instance, a PIC is designed such that the channels have the same arrival time. In another instance, a PIC is designed such that the two or more of the channels have a different amount of delay. Further, PIC can be designed to control the relative phase of the light signal.

SUMMARY

In one example, a method includes receiving an optical circuit design. The optical circuit design includes optical circuit elements and channels optically connecting the optical circuit elements. The method further includes, determining a first compensation length for a first channel of the channels based on a first measured length parameter of the first channel and a first design length parameter associated with the first channel. Further, the method includes determining a compensation circuit element based on the first compensation length, and determining an updated optical circuit design based on the compensation circuit element.

In one example, a system includes a memory storing instructions, and a processor. The processor is coupled with the memory and is configured to execute the instructions. The instructions, when executed, cause the processor to receive an optical circuit design. The optical circuit design includes optical circuit elements and channels optically connecting the optical circuit elements. The processor further determines a first compensation length for a first channel of the channels based on a first measured length parameter of the first channel, and a first design length parameter associated with the first channel. Further, the processor determines a compensation circuit element based on the first compensation length, and determine an updated optical circuit design based on the compensation circuit element. The updated optical circuit design is saved to a memory.

In one example, a non-transitory computer readable medium includes stored instructions. The stored instruction, when executed by a processor, cause the processor to receive an optical circuit design comprising optical circuit elements and channels optically connecting the optical circuit elements. The processor further determines a first measured length parameter for a first channel of the channels based on a measured length parameter of each of the optical circuit elements associated with the first channel. Further, the processor determines a first compensation length for the first channel based on the first measured length parameter and a first design length parameter associated with the first channel. The processor further determines a compensation circuit element based on the first compensation length. The compensation circuit element comprises one of a length and a shape associated with the first compensation length. Further, the processor determines an updated optical circuit design based on the compensation circuit element.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
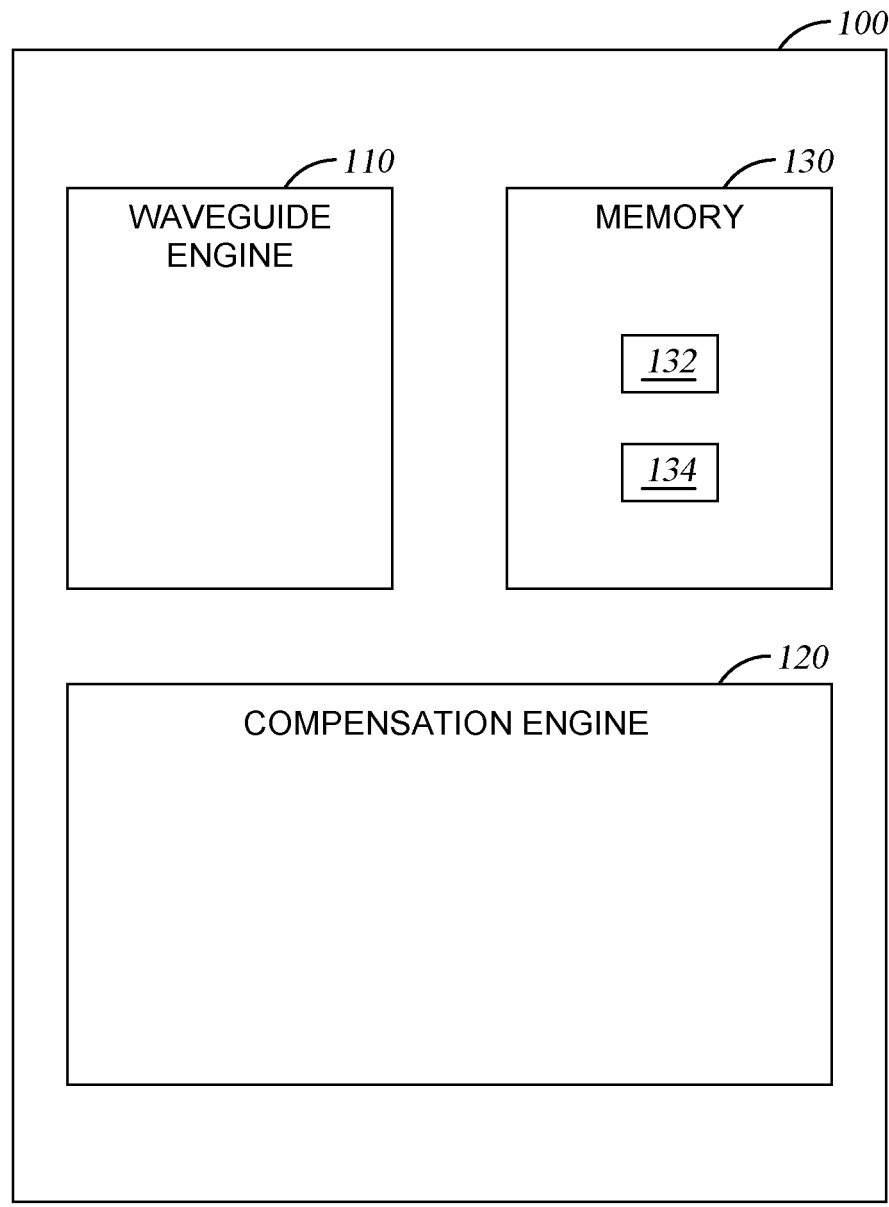
FIG. 1 illustrates a schematic block diagram of an optical circuit design system, according to one or more examples.

Aspects of the present disclosure relate to length compensating waveguide for an optical circuit.

A photonic integrated circuit (PIC) device, or optical IC device, is a circuit device that uses a light signal for communication. In one example, light signals are used to communicate data in between parts of the same system or between systems. In other examples, light signals are used for sensing applications. In one or more examples, a PIC device is a device that contains photonic (or optical) circuit elements which communicate with each other with a light signal. The photonic circuit elements pass through optical components in the PIC device such as a waveguide, a laser, a polarizer, and a phase shifter. The optical signals may have an optical wavelength within a wavelength range of about 400 nanometers (nm) to about 10,000 nm in one example. PIC devices may be used in telecommunication systems, light detection and ranging (LiDAR) systems, medical systems (e.g., bio-photonics), gas sensing system, and fiber-optic communication systems, among others.

A PIC device includes one or more channels that function as a path for light signal. Each channel is a waveguide path, or waveguide. Each of the channels includes one or more photonic circuit elements (e.g., one or more straight waveguides, and/or one or more bending waveguides). A PIC device may further include a compensation circuit element. A compensation circuit element adjusts the delay of a channel or channels. Each channel may include a respective compensation circuit element.

During the design of a PIC device, the compensation circuit element is positioned based on waveguide pins within a layout of the optical circuit design. The waveguide pins define where the optical circuit design connects to the other photonic circuit elements. The waveguide pins are generated interactively by a user based on an optical circuit design or automatically based on the optical circuit design. In one example, the compensation circuit element includes a set of length, delay, and/or phase compensating structures. The compensation circuit ensures that the length, delay, and/or phase constraints of the corresponding circuit design are satisfied.

Technical advantages of the present disclosure include, but are not limited to, automatically determining the features of the compensation circuit elements based on a difference between design timing parameters and measured timing parameters, and other circuit design constraints (e.g., circuit area constraints, sizing constraints, and shape constraints, among others). Other processes for determining compensation circuit elements require the circuit designer to enter the parameters of the compensation circuit elements, and the corresponding optical circuit design is simulated to verify the optical circuit design. However, in instances where the simulation of the optical circuit design determines that the optical circuit design does not function properly, the parameters of the compensation circuit elements are updated by the circuit designer, and the optical circuit design is simulated again. The updating and simulating process is repeated until, the functionality of the optical circuit design is verified. However, the updating process is time-consuming and error prone. Further, as the number of simulations increases, the processing resources and processing time increases. The processes for determining compensation circuit elements as described herein reduces the amount of time consumed by and errors that occur during the updating process, and the number of optical circuit design simulations by determining the features of the compensation circuit elements at least based on the difference between design timing parameters and measured timing parameters. Accordingly, the process for determining compensation circuit elements as described herein uses less processing resources and processing time as compared to other processes.

In one or more examples, a layout of a PIC device is implemented from an optical circuit design. The layout of the PIC device may be generated via an interactive layout editor, where waveguides can be placed, moved and deformed interactively or automatically to guide the signals from one place to another. In many cases, multiple waveguides need to be routed from one part of the chip to another, while avoiding obstructions.

When implementing the layout of a PIC device in an interactive layout editor, some waveguide configurations are manually chosen and placed, then moved and deformed to guide the signals from one place to another. After placement, each manually placed waveguide is individually verified to ensure signal timing and/or phase are appropriate for the circuit. However, due to the circuit complexity of PIC devices, multiple waveguide geometries are chosen and verified to ensure design constraints are met, while avoiding obstructions. Some methods for generating a layout of a PIC device require manual input from a circuit designer. Due to the complexity of the PIC devices, the manually placing and defining the waveguides is time consuming and error prone. The process for placing and defining waveguides as described herein places and defines the waveguides without requiring user input, reducing errors within the layout and decreasing the amount of time taken to generate the layout.

FIG. 1 illustrates an optical circuit design system 100, according to one or more examples. The optical circuit design system 100 includes one or more processors (e.g., the processing device 802 of FIG. 8) that execute instructions (e.g., instructions 826 of FIG. 8) stored in a memory (e.g., the memory 130, the memory 804 of FIG. 8, and/or machine-readable medium 824 of FIG. 8) to determine a delay element for a photonic circuit design (e.g., the optical circuit design 132). For example, the optical circuit design system 100 obtains the optical circuit design 132 from the memory 130. In another example, the optical circuit design system 100 receives, or otherwise obtains, the optical circuit design 132 from another system communicatively connected to the optical circuit design system 100. The optical circuit design system 100 determines a delay circuit element and generates an updated optical circuit design 134 by including the delay circuit element within the optical circuit design 132.

In one or more examples, the optical circuit design system 100 includes a waveguide engine 110, a delay compensation engine 120, and the memory 130. The waveguide engine 110 includes one or more processors (e.g., the processing device 802 of FIG. 8) that execute instructions (e.g., instructions 826 of FIG. 8) stored in a memory (e.g., the memory 130, the memory 804 of FIG. 8, and/or machine-readable medium 824 of FIG. 8). The waveguide engine 110 obtains the optical circuit design 132 from the memory 130, another engine of the optical circuit design system 100, or another system. Further, the waveguide engine 110 determines parameters of circuit elements of the optical circuit design system 100, and generates the optical circuit design 134 based on the optical circuit design 132 and a delay element determined based on the circuit element parameters. The updated optical circuit design 134 is saved in the memory 130, communicated to another engine of the optical circuit design system 100, and/or communicated to another system.

Figure 8:
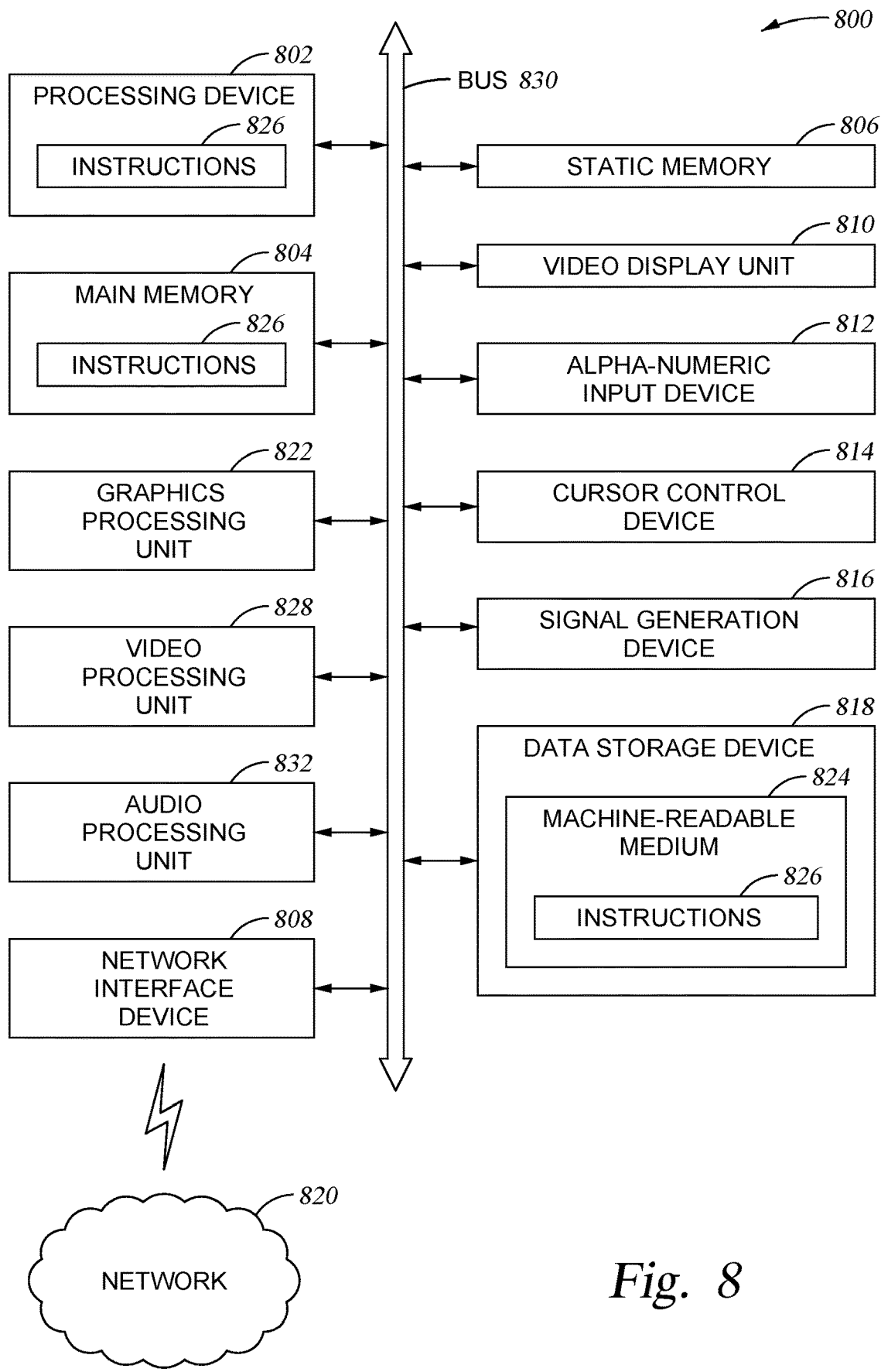
FIG. 8 depicts a diagram of an example computer system in which embodiments of the present disclosure may operate.

The delay compensation engine 120 includes one or more processors ((e.g., the processing device 802 of FIG. 8) that execute instructions (e.g., instructions 826 of FIG. 8) stored in a memory (e.g., the memory 130, the memory 804 of FIG. 8, and/or machine-readable medium 824 of FIG. 8). The delay compensation engine 120 generates the delay element from the circuit element parameters. For example, the delay compensation engine 120 receives the circuit element parameters from the waveguide engine 110 and/or the memory 130 and generates the delay circuit element. In one example, the optical circuit design 132 includes multiple channels, and the delay compensation engine 120 generates a delay circuit element for each of the channels.

In one or more examples, the waveguide engine 110 and the compensation engine 120 may be combined within the same processor. For example, a processor may be configured to perform one or more functions of the waveguide engine and one or more functions of the compensation engine.

The memory 130 is configured similar the memory 804 of FIG. 8, and/or machine-readable medium 824 of FIG. 8. The memory 130 stores the optical circuit design 132 and the updated optical circuit design 134.

Figure 2:
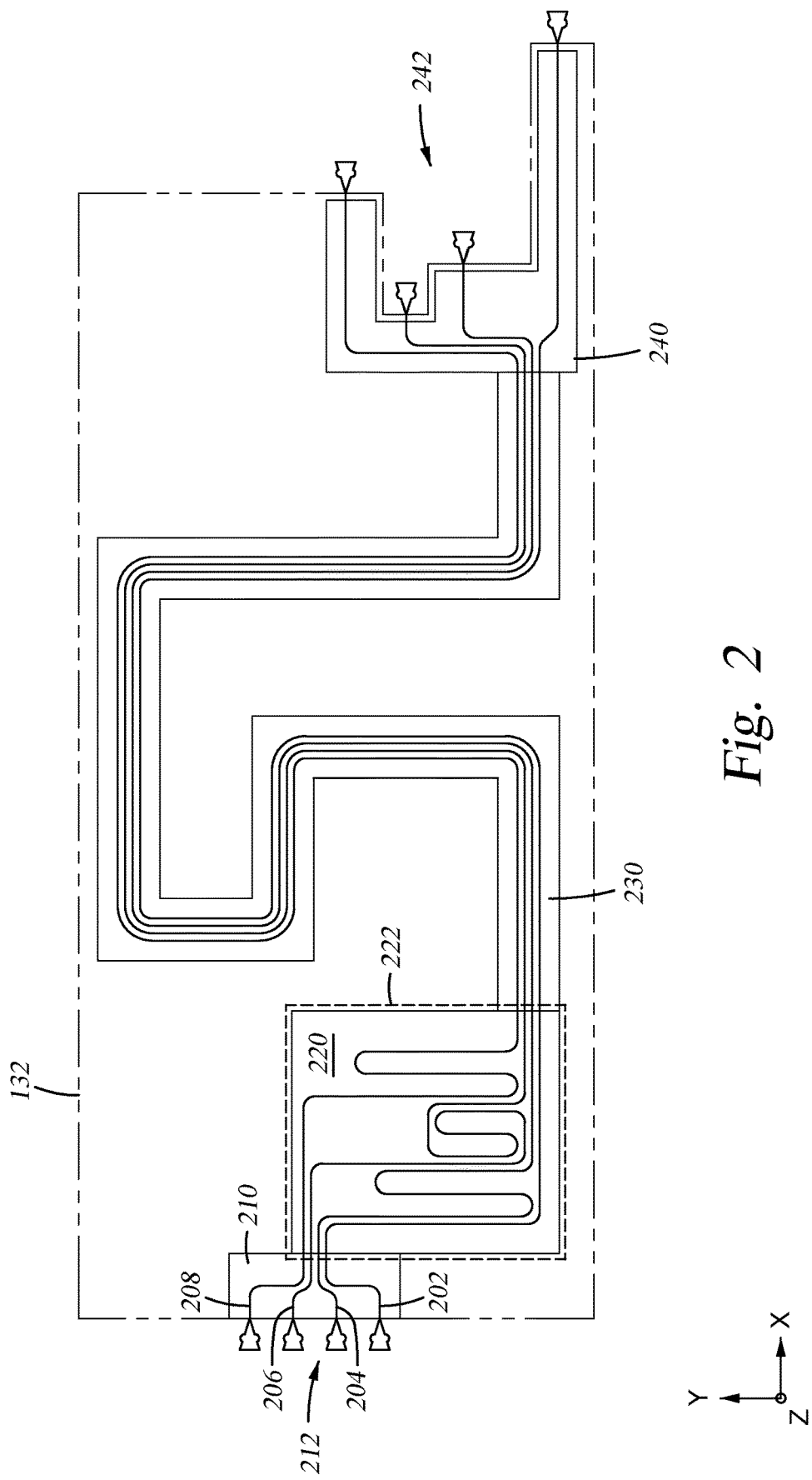
FIG. 2 illustrates a layout of an optical circuit design, according to one or more examples.

FIG. 2 illustrates a schematic diagram of the optical circuit design 132, according to one or more examples. The optical circuit design 132 includes optical circuit elements including an input circuit element 210, a compensation circuit element 220, a bus circuit element 230, and an output circuit element 240. An output of the input circuit element 210 is optically connected to an input to the compensation circuit element 220. Optically connected elements provide a path for a light signal to be communicated between the elements. An output of the compensation circuit element 220 is optically connected to an input to the bus circuit element 230. An output of the bus circuit element 230 is optically connected to an input of the output circuit element 240.

In one or more examples, the input circuit element 210 is an input pitch converter. The input circuit element 210 is optically connected to input connectors 212 and creates waveguides from the input connectors 212 to a single plane. The input connectors 212 are fiber coupling devices that allows the input circuit element 210 to be connected to another element external to the optical circuit design 132. In one example, the input connectors 212 optically connect to an element external to the optical circuit design 132 to provide a path for a light signal to be communicated to the input circuit element 210. The input connectors 212 are aligned with connectors of another element to provide a path for a light signal to be communicated. In one or more examples, the waveguides are aligned and at a constant pitch.

In one or more examples, the input connectors 212 are external to the optical circuit design 132.

The compensation circuit element 220 is a compensating optical circuit that implements timing and/or shape constrains to vary the length of each of the waveguides, varying the delay of each of the waveguides.

The bus circuit element 230 implements a bus waveguide following a set of user-defined, programmatically defined, interactively defined, or automatically defined waypoints. A bus waveguide is a set of waveguides at constant pitch.

The output circuit element 240 is an output pitch converter. In one or more examples, the output circuit element 240 is optically connected output connectors 242 and forms waveguides from the output of the bus circuit element 230 to the output connectors 242. The output connectors 242 are fiber coupling devices that allows the output circuit element 240 to be connected to another element external to the optical circuit design 132. In one example, the input connectors 212 optically connect to an element external to the optical circuit design 132 to provide a path for a light signal to be communicated from the output circuit element 240. The output connectors 242 are aligned with connectors of another element to provide a path for a light signal to be communicated.

In one or more examples, the output connecters 242 are external to the optical circuit design 132.

In other examples, the optical circuit design 132 may additionally, or alternatively, include optical circuit elements different from those illustrated in FIG. 2. For example, the optical circuit design 132 may include one or more of an optical splitter circuit elements, optical amplifier circuit elements, optical modulator circuit elements, and filter circuit elements, among others. Optical splitter circuit elements split an optical signal into two or more optical signals. The optical amplifier circuit elements amplify an optical signal. Optical modulator circuit elements modulates an optical signal. An optical modulator circuit element may be one of an amplitude modulator, phase modulator, or polarization modulator, among others. Filter circuit elements filter one or more wavelengths of the optical signal.

In one or more examples, input connectors 212 to the optical circuit design 132 are at a fixed pitch, and the input circuit element 210 may be omitted from the optical circuit design 132. Further, in one or more examples, the output connectors 242 of the optical circuit design 132 are at a fixed pitch and the output circuit element 240 is omitted from the optical circuit design 132. Further, in one or more examples, the pitch conversion circuitry of the input circuit element 210 and/or the output circuit element 240 may be included within the compensation circuit element 220 or the bus circuit element 230. As an alternative, an implementation may include the pitch conversion technology directly in the delay of the compensating circuit element 220 or bus circuit element 230. In one or more examples, the optical circuit design 132 may omit the bus circuit element 230.

In one or more examples, the bus circuit element 230 includes multiple waveguides that guide optical signals. The multiple waveguides are routed from one point of the PIC chip to another point within the PIC chip. The multiple waveguides may include one or more shapes and/or changes of direction between the different points within the PIC chip.

In one example, the optical circuit design 132 includes a plurality of channels 202, 204, 206, and 208. In one or more examples, each channel 202, 204, 206, and 208 of the optical circuit design 132 corresponds to a continuous optical path from an input connector 212 to an output connector 242. For example, each channel 202, 204, 206, and 208 corresponds to a continuous optical path from an input connector 212 of the input circuit element 210 to an output connector 242 of the output circuit element 240. In one example, each channel 202, 204, 206, and 208 corresponds to an input connector 212 of the input circuit element 210, a waveguide of the bus circuit element 230, and an output connector 242 of the output circuit element 240. For example, each input connector 212 of the input circuit element 210 is optically connected to a respective waveguide of the bus circuit element 230, which is connected to a respective output connector 242 of the output circuit element 240, forming one of the channels 202, 204, 206, and 208.

Figure 3:
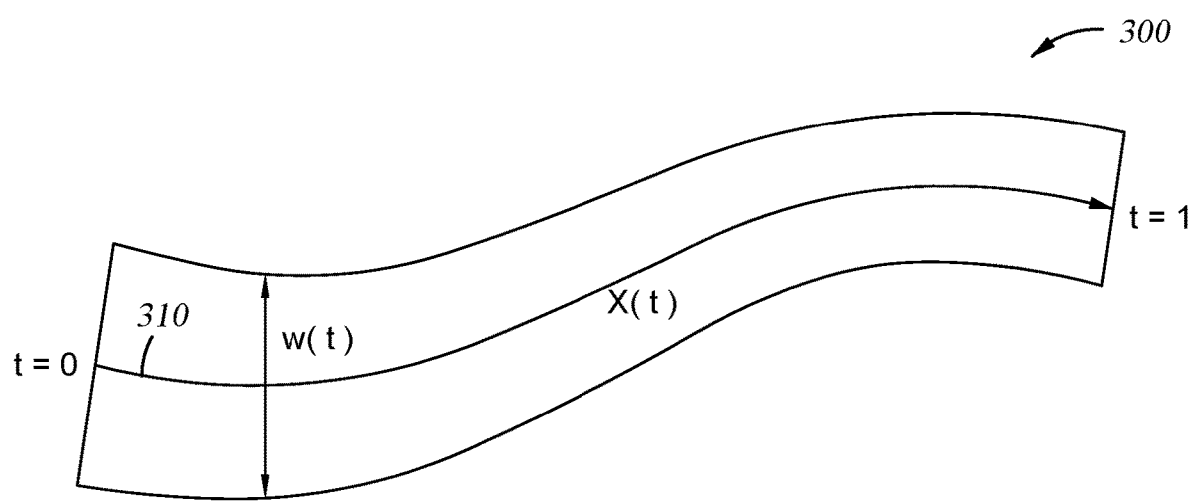
FIG. 3 illustrates an example waveguide, according to one or more examples.
Figure 4:
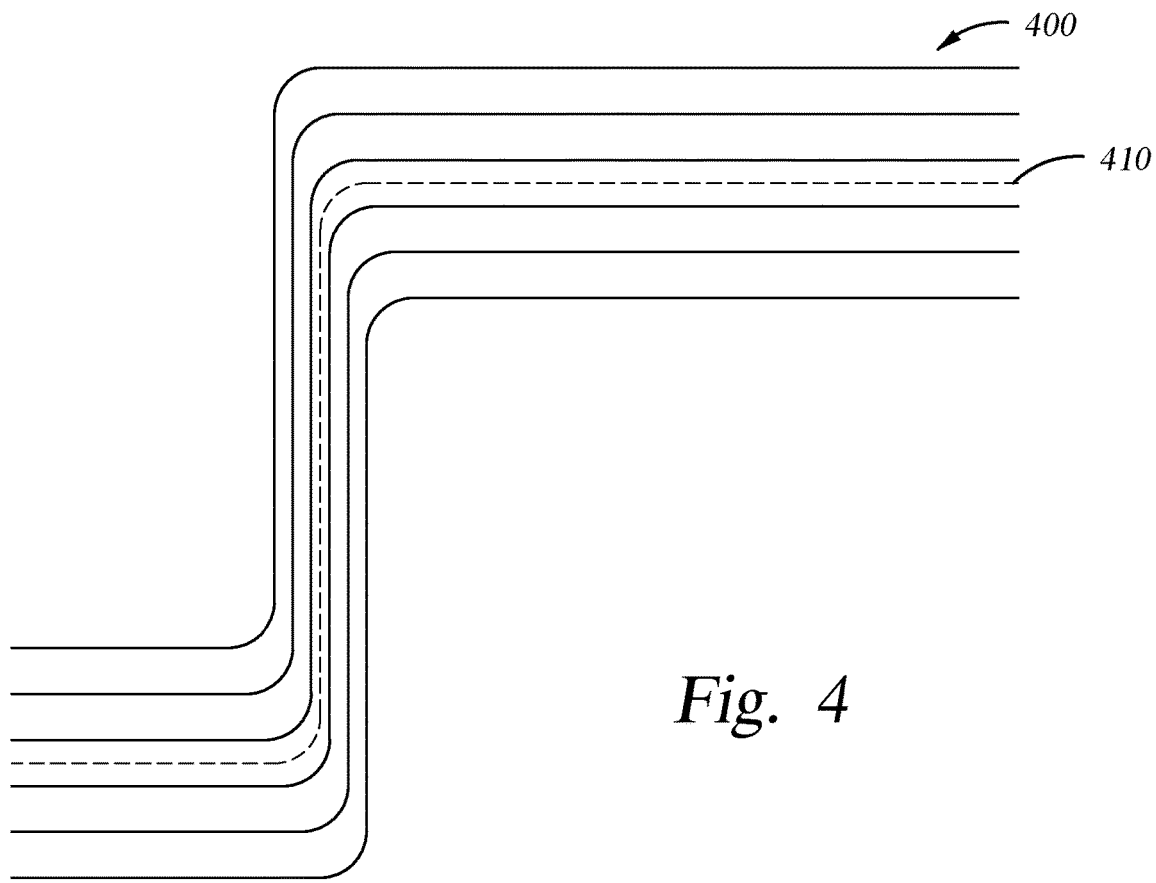
FIG. 4 illustrates an example bus circuit element including a plurality of waveguides, according to one or more examples.

In one or more examples, the waveguides of the bus circuit element 230 are routed to avoid obstructions within the corresponding PIC chip. In one or more examples, the multiple waveguides of the bus circuit element follow the same center path. In this context, a waveguide has a (typical fixed) width, and if a waveguide curves upwards the left-side is shorter than the right side of the waveguide. For the geometrical length the middle, or center path, is used. For a polar/simple bend, the inner length=(radius−width/2)*angle, the outer side=(radius+width/2)*angle and the length is radius*angle, where "*" is a product function. FIG. 3 is a schematic diagram 300 of a waveguide showing a center 310, according to certain embodiments. FIG. 4 is a diagram of a bus circuit element 400, depicting a center path 410 of the bus circuit element 400, according to certain embodiments. In one or more examples, to ensure a bus circuit element (e.g., the bus circuit element 230) complies with the constraints of an optical circuit design (e.g., the optical circuit design 132), the compensation circuit element 220 generated as described with regard to method 500 of FIG. 5. In one or more examples, the constraints correspond to a length constraint, delay constraint, and/or phase constraint.

In one or more examples, the phase of the light at the end of a waveguide is equal to 2pi/lambda (where lambda is the wavelength of the light) times an optical length of the waveguide. The optical length is the integrated effective index along the length of the waveguide.

The delay of a pulse of light guided through a waveguide is equal to 1/c (where c is the speed of light) times a group length of the waveguide. The group length is the integrated group index along the length of the waveguide.

Since both the effective index and the group index depend on the local width and the local radius of curvature of the waveguide, the optical length and the group length are a function of the exact center path shape and width distribution of the waveguide. The physical length depends on the length of the center path.

In one example, the waveguides are a series of connected waveguide components which typically include, but are not restricted to, straights, circular bends, Euler or adiabatic bends. The geometry of the waveguide is derived from the parameters of the waveguide using analytic functions. Further, parameters of the waveguide (e.g., length, radius and angle) can be obtained using mathematical formulas or numerical algorithms. In one or more examples, waveguide components are placed in series, and by adjusting the parameters of the waveguide (e.g., length, radius and angle), the location of the waveguide is reached. Accordingly, the length of the waveguide is determined after placement of the waveguide.

In one or more examples, during the schematic design process of an optical circuit, the layout implementation of the compensating optical circuit is undetermined. Accordingly, to simulate the optical circuit, a mock-up of the optical circuit design that complies with the constraints of the circuit design is used. The constraints of the circuit design corresponds to a length parameter (e.g., physical length, optical length, and/or group length). In one or more examples, if a linear length difference of 100 micrometers per waveguide is requested, the schematic of the delay circuit device contains simple straight waveguides with that length distribution.

Figure 5:
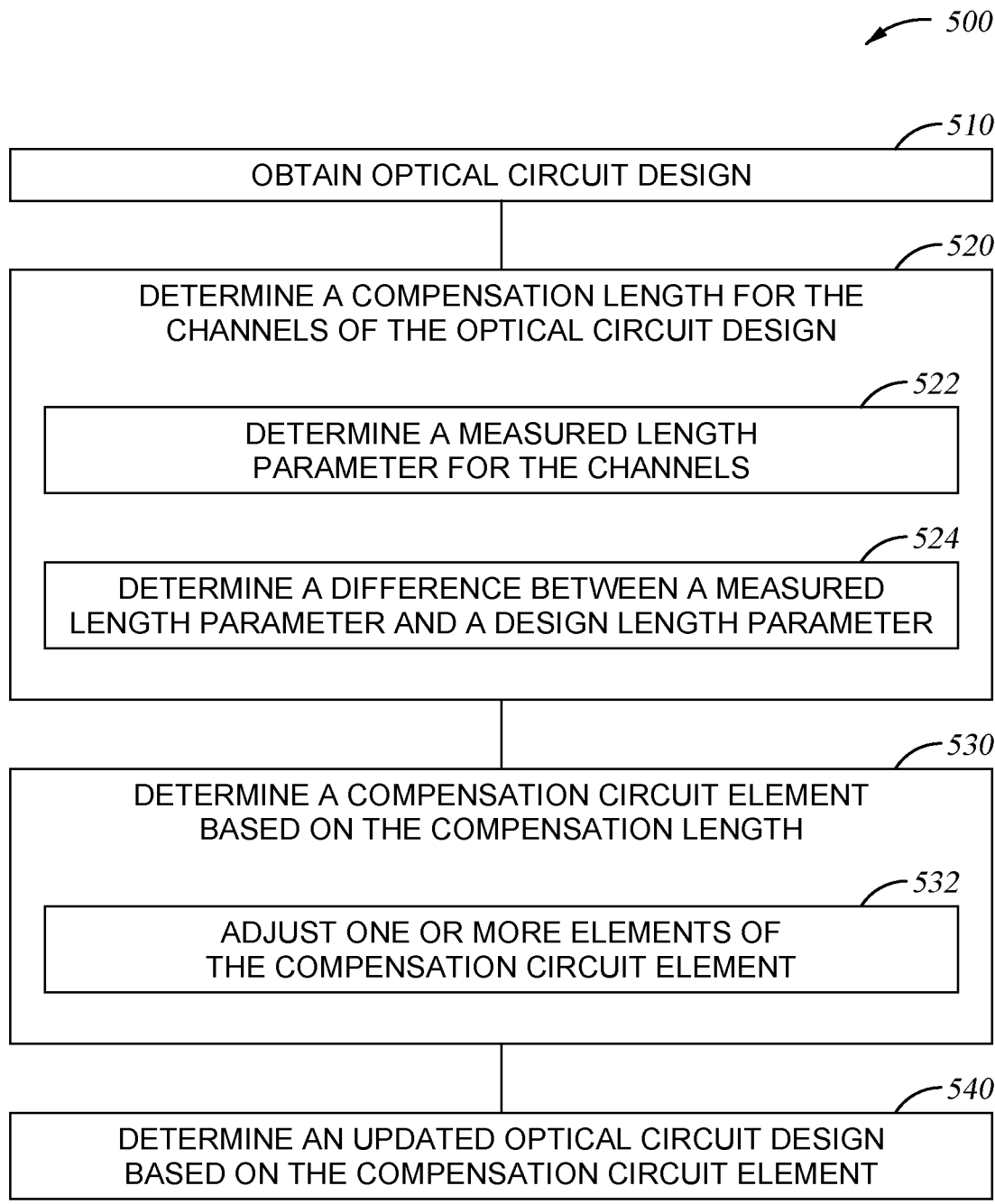
FIG. 5 illustrates a method for determining a compensating circuit element, according to one or more examples.

FIG. 5 illustrates a flowchart of a method 500 for generating a compensation circuit element within an optical circuit design, according to one or more examples. The method 500 is performed by the optical circuit design system 100. For example, one or more processors of the optical circuit design system 100 execute instructions stored in a memory to perform the method 500.

At 510 of the method 500, an optical circuit design is obtained. For example, the waveguide engine 110 obtains the optical circuit design 132 from the memory 130. In other examples, the waveguide engine 110 obtains the optical circuit design 132 from another engine within the optical circuit design system 100 or a system external to the optical circuit design system 100.

In one or more examples, the waveguide engine 110 obtains one or more length parameters corresponding to the optical circuit design 132. In one example, the length parameters correspond to a physical, an optical, and/or a group length of each section of the optical circuit design 132. In another example, the length parameters correspond to a relative distance in a physical length, an optical length, and/or group length between channels of the optical circuit design 132.

In one or more examples, the waveguide engine 110 places the variable length components of the optical circuit design 132 within a schematic layout. In one example, with reference to FIG. 2, the variable length components include the input circuit element 210, the bus circuit element 230, and the output circuit element 240. In one or more examples, the variable length components introduce a difference in length between the channels 202, 204, 206, and 208 within the optical circuit design 132. Length differences within the channels correspond to differences in delays between the channels 202, 204, 206, and 208. In one or more examples, the input circuit element 210 and the output circuit element 240 are pitch converters, wherein the input and output connectors can have a variable location. Accordingly, in such examples, the input circuit element 210 and the output circuit element 240 have a varying length. In one or more examples, adjusting the position of an input connector 212 and/or output connector 242 varies the length of a corresponding channel, altering the delay of the corresponding channel. Further, in one or more examples, the bus circuit element 230 may generate length differences between channels, altering the delay of the corresponding channel. For example, a bus circuit element having a different number of left turns from right turns of the same radius will generate length differences between channels. For example, in a bus circuit element that only makes left turns then the left-most channel will end up being the shortest, as the left-most channel always takes the inner turn.

In one example, the length differences between channels may be defined such that each channel is "M" microns longer than a next channel. M is greater than 0. For example, with reference to FIG. 2, the length difference between the channels 202, 204, 206, and 208 may be defined as 50 microns. Accordingly, the length difference between the channel 204 and the channel 202 is 50 microns, the length difference between the channel 206 and the channel 204 is 50 microns, and the length difference between the channel 208 and the channel 206 is 50 microns. In another example, the length differences of the channels are defined per channel. In such an example, one of the channels is defined as a reference with a length difference of "0", and each of the length differences of the other channels is relative to the channel defined as the reference. For example, with reference to FIG. 2, the channel 202 may be defined as the reference with a length difference of "0". Further, in such an example, the length difference of channels 204, 206, and 208 is relative to the channel 202. In other example, one of the channel 204, 206, and 208 may be defined as the reference to which the length differences of the other channels are relative. The length difference between each of the channels may be differ from channel to channel, such that the length difference between a first two channels is different from that of a second two channels. In another example, the length difference is the same between each of the channel.

The length differences may be included with the circuit element parameters associated and/or included with the optical circuit design, or a file separate from the optical circuit design.

At 520 of the method 500, a compensation length for a channel of the optical circuit design is determined. For example, the waveguide engine 110 determines a compensation length for a channel of the optical circuit design 132. The channel may be in any position within the channels of the circuit design. For example, the channel may be proximate the center of the channels of the circuit design 132. In another, the channel may be proximate an edge of the channels of the circuit design 132. In one example, the waveguide engine 110 determines the physical length, optical length, and/or group length of each channel of the optical circuit design 132. The waveguide engine 110 analyzes the subcomponents of each channel to determine the physical, optical, and/or group length of each channel 202, 204, 206, and 208. With reference to FIG. 2, the waveguide engine 110 analyzes the input circuit element 210, the bus circuit element 230, and the output circuit element 240 to determine the physical, optical, and/or group length for each channel 202, 204, 206, and 208. The physical, optical, and/or group length for each channel is saved as a measured length parameter within the memory 130.

In one example, determining a compensation length for a channel of the optical circuit design includes 522 of the method 500, determining a measured channel length parameter for the channel. The waveguide engine 110 may determine a measured channel length parameter for each of the channels within optical circuit design. The waveguide engine 110 determines a measured length parameter of the components in each channel. The waveguide engine 110 combines (e.g., sums or combines in some other way) the measured length parameter of the components for a channel to determine the measured length parameter for that channel. In one example, the waveguide engine 110 determines an optical length, a physical length, and/or group length of each component within the optical circuit design. With reference to FIG. 2, the waveguide engine 110 determines a measured length parameter for each channel 202, 204, 206, and 208. In one example, the waveguide engine 110 measures the optical length, physical length, and/or group length of each of the input circuit element 210, the bus circuit element 230, and the output circuit element 240 with respect to each of the channels 202, 204, 206, and 208 to determine the measured length parameter for each 202, 204, 206, and 208. In one or more examples, the optical length and/or the group length are determined based on a function of the center path and width distribution of the waveguide. The physical length is determined based on the length of a center path of the waveguide. In one or more examples, a physical length can be determined from a mathematical description of a waveguide. Further, the optical and/or group length can be determined through the application of a curve fitting process. In another example, the length parameter (e.g., propagation constant) for a waveguide is determined based on each width, radius, and wavelength associated with the waveguide.

In one or more examples, a forward calculation is used to determine a compensation length, e.g. compensationlength=function(curve shape, parameters). Further, for a given compensation length, a function of the compensation length and corresponding curve shape can be used to determine the parameters of the waveguide, e.g., parameters=function(compensationlength, curve shape).

In one example, determining a compensation length for a channel of the optical circuit design at 520 of the method 500 includes 524 of the method 500, determining a difference between a measured length parameter and a design length parameter. The compensation length may correspond to one or more of a physical length, optical length, and a group length. The waveguide engine 110 obtains design length parameters for each channel of the optical circuit design 132. In one example, the design length parameters define an optical length, physical length, and/or group length for each channel within the optical circuit design 132. In one or more examples, the design length parameters define an optical length, physical length, and/or group length for each component (e.g., the input circuit element 210, the bus circuit element 230, and the output circuit element 240).

The waveguide engine 110 subtracts the design length parameter for each channel from the measured length parameter for each respective channel to determine a length parameter difference between the measured length parameter and the design length parameter for each channel. In one example, determining the difference between the design length parameter for each channel from the measured length parameter for each channel determines length differences introduced by circuit elements.

The waveguide engine 110 stores the compensation length within the memory 130.

At 530 of the method 500, a compensation circuit element is determined based on the compensation length. For example, the delay compensation engine 120 determines one or more parameters for the compensation circuit element 220 for each channel based on the compensation length.

In one example, the compensation length may be used to determine one or more of the physical length, the optical length, or the group length to be compensated for by a compensation circuit element (e.g., the compensation circuit element 220). For example, the shape and/or length of the compensation circuit element 220 for each channel corresponds to the compensation length for each respective channel. In one example, the compensation circuit element 220 includes varying length shape elements including S-shapes, meander shapes, spirals, or other shapes to varying the length of each channel to compensate for differences between an intended delay for each channel and the measure delay for each channel. Further, the shape of the compensation circuit element 220 can be varied to fit within an available space constraint of the optical circuit design 132. The space constraint is illustrated by bounding box 222 in FIG. 2. In other examples, the space constraint may be larger or smaller than that illustrated by the bounding box 222 in FIG. 2. The space constraint defines the available circuit area that can be used to route the elements of the optical circuit design 132. The shapes of the compensation circuit element 220 may include one or more of meanders, spirals, or S-shapes, which have models for the physical length, the optical length, and a group length as function of the corresponding parameters. In one or more examples, the equations to obtain the correct parameter set for a given length parameter can be solved either directly or through numerical optimization based on a shape parameter, length parameter, and/or space constraint parameter.

In one example, the compensation circuit element 220 is created with regard to each channel 202, 204, 206, and 208 of the optical circuit design 132. The compensation circuit element 220 may have a different optical length, physical length, and/or group length for each channel 202, 204, 206, and 208. In one example, the compensation circuit element 220 has the same optical length, physical length, and/or group length for two or more of the channels 202, 204, 206, and 208.

In one or more examples, the compensation length of a first channel may act as a reference compensation length for each of the other channels. In such an example, each channel has a specified difference from the reference length. Each channel may have the same difference from the reference length, or two or more channels may have a different difference. The difference is zero or more. The compensation circuit element 220 is created based on the reference compensation length and the specified differences for each of the channels. In one example, one or more of the channels is adjusted based on the reference compensation length and the specified differences.

Figure 6:
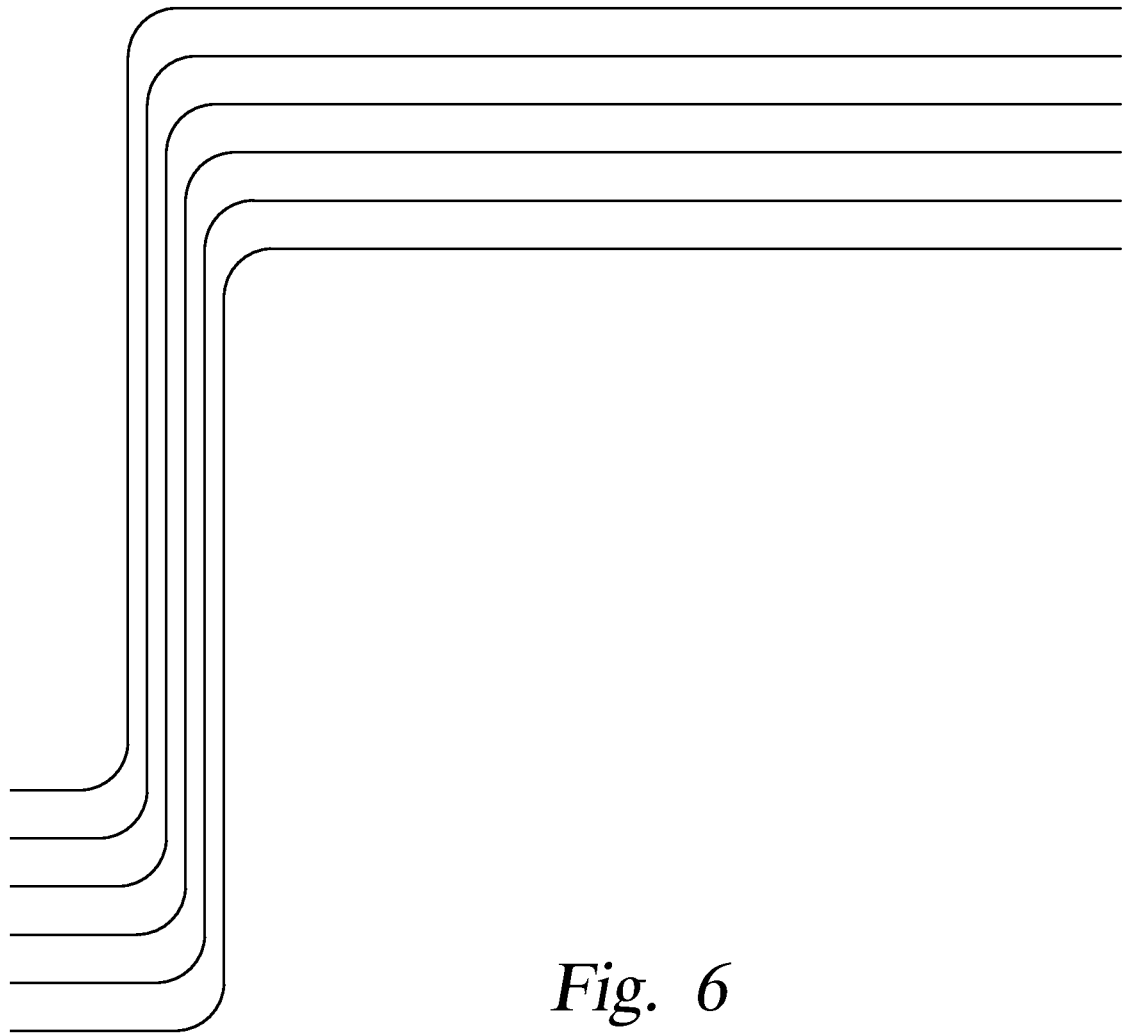
FIG. 6 illustrates an example compensating circuit element, according to one or more examples.

FIG. 6 illustrates a compensation circuit element 600 not having windings, spirals, tapers, and transitions, among others. In one example, determining the compensation circuit element 220 includes 532 of the method 500, adjusting one or more elements of the compensation circuit elements. For example, the maximum amount of extra length for each individual channel 202, 204, 206, or 208 is determined. The maximum length is used to determine and/or adjust the parameters of waveguide components (waveguide elements) of the compensation circuit elements. The waveguide components include windings, spirals, tapers, and/or transitions, among others.

In one example, the maximum length is used to iteratively generate the smallest possible square spiral of the compensation circuit element for the given number of turns by increasing the amount of turns by 1 on each iteration. After each generation, the length of the compensation circuit element 220 with regard to each channel 202, 204, 206, and 208 is measured. The compensation circuit element 220 is saved in the memory 130. In one example, to introduce the length difference per channel 202, 204, 206, and 208, for each channel the spiral with the greatest length that is still shorter than the required length for that channel is selected. The length of a spiral of the compensation circuit element 220 can be adjusted to match the design length parameters by extending straight waveguide portions. In one example, the spiral of the compensation circuit element 220 is a square spiral that includes straight and bending waveguides.

In other examples, while not shown, the compensation circuit element 220 includes tapers, transitions, and/or other waveguide components that can be adjusted to adjust a length parameter of the compensation circuit element 220. Further, the tapers, transitions, and/or other waveguide components may be included within or in addition to the spirals of the compensation circuit element 220 and used to adjust the length of the spirals.

In one or more examples, for each channel, a selected spiral of the compensation circuit element is adjusted in the X and Y direction to match the design length parameters. In one example, to ensure that the optical circuit design 132 has room for the spirals of the delay circuit, available space in the channels is adjusted based on length and design circuit device shape constraints. For example, if a spiral of a first channel requires more space in the X direction, a second channel next to it can make room for it by shrinking a corresponding spiral in the X direction and increasing the corresponding spiral in the Y direction while maintaining a length specification.

Figure 7:
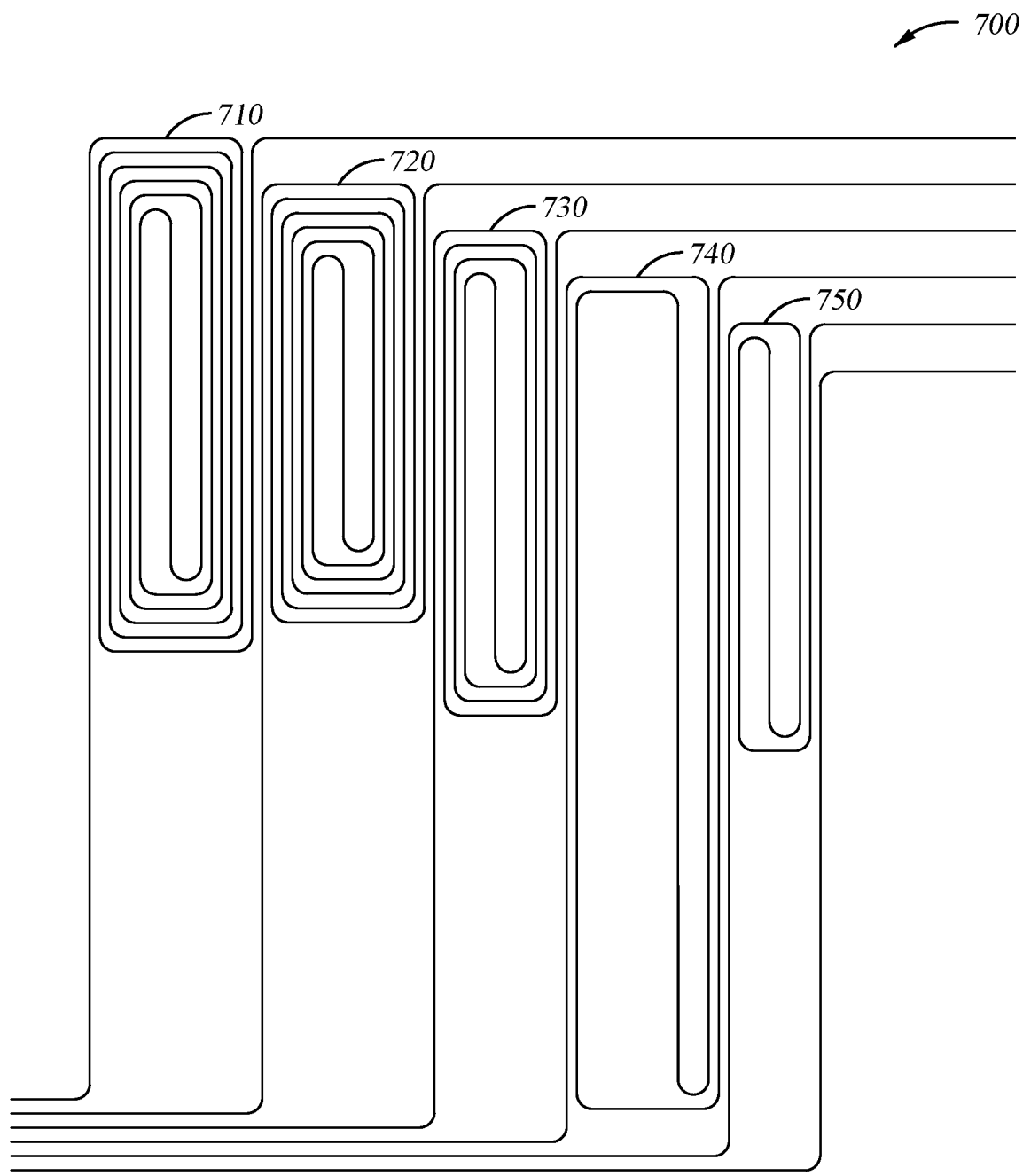
FIG. 7 illustrates another example compensating circuit element, according to one or more examples.

FIG. 7 illustrates another compensation circuit element 700 having spirals 710, 720, 730, 740, and 750. One or more of the spirals 710, 720, 730, 740, and 750 can be adjusted in the X and/or Y direction to adjust the length of each corresponding channel. Further, one or more of the spirals 710, 720, 730, 740, and 750 can be adjusted in the X and/or Y direction to provide space for another one or more of the spirals 710, 720, 730, 740, and 750.

In one or more examples, adjusting a channel in an X and/or Y direction based on the adjustments of another channel in an X and/or Y direction allows for an optical circuit to be adjusted in the case that the design length parameters are optical lengths or group lengths. Optical lengths and group lengths as the optical lengths and group lengths of a straight waveguide is always the geometrical length times a constant that follows from Maxwell equations calculated using mode solvers. In one example, if the initial solution for the first channel requires x more optical length and there is room to stretch in the Y direction, the amount of match stretching is determined from: x/constant/(2*number of windings).

At 540 of the method 500, an updated optical circuit design is determined based on the compensation circuit. For example, waveguide engine 110 generates the updated optical circuit design 134 based on the delay circuit. The updated optical circuit design 134 is stored in the memory 130. In one example, the updated optical circuit design is simulated to determine whether or not the updated optical circuit design functions within the expected design length parameters.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    receiving an optical circuit design comprising optical circuit elements and optical channels optically connecting the optical circuit elements;
    determining a first compensation length for a first optical channel of the optical channels based on a difference between a first measured length parameter of the first optical channel and a first design length parameter associated with the first optical channel, wherein the first compensation length comprises one or more of a physical length, an optical length, and a group length;
    determining, by a processing device, a compensation circuit element based on the first compensation length, wherein the compensation circuit element comprises a varying length shape element associated with the first optical channel; and
    determining an updated optical circuit design based on the compensation circuit element.

2. The method of claim 1, further comprising saving the updated optical circuit design to a memory.

3. The method of claim 1, wherein determining the compensation circuit element comprises determining a shape of the compensation circuit element based on the first compensation length.

4. The method of claim 3, wherein the shape of the compensation circuit element is further determined based on a circuit area constraint.

5. The method of claim 1 further comprising:
    determining a second compensation length for a second optical channel of the optical channels based on a second measured channel length of the second optical channel, and a second design length parameter associated with the second optical channel, wherein the compensation circuit element is further determined based on the second compensation length.

6. The method of claim 1, wherein determining the first measured length parameter of the first optical channel comprises determining a measured length parameter for each of the optical circuit elements associated with the first optical channel and combining the measured length parameter for each of the optical circuit elements.

7. The method of claim 1, wherein one or more of a number of windings, a shape, and length of the varying length shape element is determined based on the first compensation length.

8. A system comprising:
a memory storing instructions; and
a processor, coupled with the memory and configured to execute the instructions, the instructions when executed cause the processor to:
receive an optical circuit design comprising optical circuit elements and optical channels optically connecting the optical circuit elements;
determine a first compensation length for a first optical channel of the optical channels based on a difference between a first measured length parameter of the first optical channel, and a first design length parameter associated with the first optical channel, wherein the first compensation length comprises one or more of a physical length, an optical length, and a group length;
determine a compensation circuit element based on the first compensation length, wherein the compensation circuit element comprises a varying length shape element associated with the first optical channel; and
determine an updated optical circuit design based on the compensation circuit element, and saving the updated optical circuit design to a memory.

9. The system of claim 8, wherein the processor further determines the compensation circuit element comprises determining a shape of the compensation circuit element based on the first compensation length.

10. The system of claim 9, wherein the shape of the compensation circuit element is further determined based on a circuit area constraint.

11. The system of claim 8, wherein the processor further:
determines a second compensation length for a second optical channel of the optical channels based on a second measured channel length of the second optical channel, and a second design length parameter associated with the second optical channel, wherein the compensation circuit element is further determined based on the second compensation length.

12. The system of claim 11, wherein the processor is further configured to adjust a first varying length shape element of the compensation circuit element based on the second compensation length and a space constraint, wherein the first varying length shape element is associated with the first optical channel.

13. The system of claim 8, wherein the processor further determines the first measured length parameter of the first optical channel comprises determining a measured length parameter for each of the optical circuit elements associated with the first optical channel and combining the measured length parameter for each of the optical circuit elements.

14. The system of claim 8, wherein one or more of a number of windings, a shape, and length of the varying length shape element is determined based on the first compensation length.

15. A non-transitory computer readable medium comprising stored instructions, which when executed by a processor, cause the processor to:
receive an optical circuit design comprising optical circuit elements and optical channels optically connecting the optical circuit elements;
determine a first measured length parameter for a first optical channel of the optical channels based on a measured length parameter of each of the optical circuit elements associated with the first optical channel;
determine a first compensation length for the first optical channel based on a difference between the first measured length parameter and a first design length parameter associated with the first optical channel, wherein the first compensation length comprises one or more of a physical length, an optical length, and a group length;
determine a compensation circuit element based on the first compensation length, the compensation circuit element comprises one of a length and a shape associated with the first compensation length, wherein the compensation circuit element comprises a varying length shape element associated with the first optical channel; and
determine an updated optical circuit design based on the compensation circuit element.

16. The non-transitory computer readable medium of claim 15, wherein the shape of the compensation circuit element is further determined based on a circuit area constraint.

17. The non-transitory computer readable medium of claim 15, wherein the processor further determines a second measured length parameter for a second optical channel of the optical channels based on a measured length of each of the optical circuit elements associated with the second optical channel.

18. The non-transitory computer readable medium of claim 17, wherein the processor further determines a second compensation length for the second optical channel based on the second measured length parameter and a second design length parameter associated with the second optical channel, and wherein the compensation circuit element is further determined based on the second compensation length.

19. The non-transitory computer readable medium of claim 15, wherein the processor further determines the first measured length parameter of the first optical channel comprises combining the measured length parameter of each of the optical circuit elements associated with the first optical channel.

20. The non-transitory computer readable medium of claim 15, wherein one or more of a number of windings, a shape, and length of the varying length shape element is determined based on the first compensation length.

* * * * *